(12) United States Patent
Kurokawa (10) Patent No.: US 7,532,914 B2
(45) Date of Patent: May 12, 2009

(54) RADIO NETWORK SYSTEM

(75) Inventor: Hideki Kurokawa, Tokyo (JP)

(73) Assignee: NEC Corporation (JP)

( * ) Notice: Subject to any disclaimer, the term of this patent is extended or adjusted under 35 U.S.C. 154(b) by 116 days.

(21) Appl. No.: 10/815,522

(22) Filed: Apr. 1, 2004

(65) Prior Publication Data

US 2004/0198469 A1    Oct. 7, 2004

(30) Foreign Application Priority Data

Apr. 2, 2003    (JP) ............................. 2003-098706

(51) Int. Cl.
*H04B 1/38* (2006.01)
(52) U.S. Cl. .................. 455/574; 455/572; 455/561; 455/41.2; 455/343.1; 370/311; 370/338
(58) Field of Classification Search .......... 455/572–574, 455/343.1–343.6, 41.2, 509, 561, 464, 522, 455/525; 370/311, 338, 328
See application file for complete search history.

(56) References Cited

U.S. PATENT DOCUMENTS

| | | | | |
|---|---|---|---|---|
| 5,128,938 | A * | 7/1992 | Borras | 370/311 |
| 5,175,870 | A * | 12/1992 | Mabey et al. | 455/67.11 |
| 5,278,829 | A * | 1/1994 | Dunlap | 370/257 |
| 5,625,882 | A * | 4/1997 | Vook et al. | 340/7.34 |
| 5,797,094 | A * | 8/1998 | Houde et al. | 455/412.2 |
| 5,799,256 | A * | 8/1998 | Pombo et al. | 455/574 |
| 5,857,146 | A * | 1/1999 | Kido | 340/7.38 |
| 5,883,885 | A * | 3/1999 | Raith | 370/311 |
| 6,078,826 | A * | 6/2000 | Croft et al. | 455/574 |

(Continued)

FOREIGN PATENT DOCUMENTS

JP    07-131404    5/1995

(Continued)

OTHER PUBLICATIONS

Office Action issued by the Japanese Patent Office dated Apr. 24, 2007 in connection with corresponding Japanese Application No. 2003-098706.

(Continued)

*Primary Examiner*—Sharad Rampuria
(74) *Attorney, Agent, or Firm*—Ostrolenk, Faber, Gerb & Soffen, LLP (57) ABSTRACT

A radio base station 1 is connected together with a multi-media server 3 and a multi-media terminal unit 4 to a LAN or WAN line 100 for radio communication with radio mobile terminals 2-1 to 2-N. The radio mobile terminals 2-1 to 2-N can be switched between a power-saving mode of their part-time duty service and a normal mode of their full-time duty service. The radio base station 1 manages the radio mobile terminals 2-1 to 2-N by executing discrimination as to whether they are in the power-saving mode of the part-time duty service operation or in the normal mode of the full-time duty service operation. and when the radio mobile terminals 2-1 to 2-N are in the power-saving mode of the part-time duty service operation, it acts as an agent to execute part of the processes to be executed in the radio mobile terminals 2-1 to 2-N.

11 Claims, 5 Drawing Sheets

U.S. PATENT DOCUMENTS

| | | | | |
|---|---|---|---|---|
| 6,128,504 | A * | 10/2000 | Ciccone | 455/464 |
| 6,167,268 | A * | 12/2000 | Souissi et al. | 455/434 |
| 6,463,307 | B1 * | 10/2002 | Larsson et al. | 455/574 |
| 6,526,286 | B2 * | 2/2003 | Wan | 455/515 |
| 6,529,748 | B1 * | 3/2003 | Bruner | 455/574 |
| 6,571,103 | B1 * | 5/2003 | Novakov | 455/464 |
| 6,587,450 | B1 * | 7/2003 | Pasanen | 370/338 |
| 6,606,310 | B1 * | 8/2003 | Vialen et al. | 370/338 |
| 6,611,508 | B1 * | 8/2003 | Abe | 370/332 |
| 6,856,789 | B2 * | 2/2005 | Pattabiraman et al. | 455/41.2 |
| 6,950,645 | B1 * | 9/2005 | Kammer et al. | 455/343.1 |
| 6,954,651 | B2 * | 10/2005 | Yamato | 455/509 |
| 6,973,335 | B2 * | 12/2005 | Ganton | 455/573 |
| 6,985,758 | B2 * | 1/2006 | Rankin | 455/574 |
| 7,197,326 | B2 * | 3/2007 | Acampora | 455/522 |
| RE40,032 | E * | 1/2008 | van Bokhorst et al. | 455/343.2 |
| 2004/0033778 | A1 * | 2/2004 | Fonseca et al. | 455/11.1 |
| 2004/0208151 | A1 * | 10/2004 | Haverinen et al. | 370/338 |

FOREIGN PATENT DOCUMENTS

| | | |
|---|---|---|
| JP | 09-162798 | 6/1997 |
| JP | 2000-278165 | 10/2000 |
| JP | 2001-075687 | 3/2001 |
| JP | 2002-118874 | 4/2002 |
| JP | 2002-208887 | 7/2002 |

OTHER PUBLICATIONS

English translation of the Office Action issued by the Japanese Patent Office dated Apr. 24, 2007 in connection with corresponding Japanese Application No. 2003-098706.

* cited by examiner

RADIO NETWORK SYSTEM

BACKGROUND OF THE INVENTION

This application claims benefit of Japanese Patent Application No. 2003-098706 filed on Apr. 2, 2003, the contents of which are incorporated by the reference.

The present invention relates to radio network systems, radio base stations and radio mobile terminal agent processing methods used for such systems and stations and, more particularly, to radio LAN (Local Area Network) systems connected to internet or intranet and utilizing data communication (particularly real-time communication dealing with voice and motion picture images) on the basis of IP (Internet Protocol).

With the spread of radio communication techniques, such radio mobile terminals as portable telephone set, PHS (personal handy-phone system, PDA (personal digital assistant) and small-size note-type personal computer, have become widely used. Such radio mobile terminals can be connected to internet via access points without use of any communication cable and also perform data communication with other data processing units on LAN, WAN (Wide Area Network) and PAN (Personal Area Network).

Recently, concerning this type of data communication, radio LAN communication equipment called hot-spots are installed in various places such as station premises and coffee shops. By providing a radio function to them, these radio mobile terminals permit their connection to internet via the hot-spots when their owners are out of home, permit reading home pages and transmission and reception of electronic mails.

Also, by using such a radio communication system, enterprises, shops and offices can reduce man-hours and expenditures for laying the communication cable such as LAN cable a fresh with a floor change. Furthermore, the system easily and quickly permits communication without need of any process of directly connecting terminals, the owners of which are frequently moved in departments and buildings, to a fixed cable.

In the above radio communication system, the radio mobile terminals are wirelessly connected to the radio base station as access point, and therefore the power supply line is usually not directly coupled to the radio mobile terminals. In other words, as a rule the radio mobile terminals are battery driven, and can only exceptionally use a charging device such as charging stand or a power supply adapter when they are located near a desk or like fixed place. Accordingly, it is heretofore been contrived to reduce the power consumption of the radio mobile terminals so as to be able to use the battery for longer time or reduce the power consumption to reduce the battery with as much as possible.

Among the power consumption reducing methods is one, which permits power consumption reduction when the radio mobile terminals are found outside the permissible communication range (first technique, see Literature 1: Japanese Patent Laid-open No. 2002-208887, pages 4-6 and FIG. 1, for instance). In this method, however, a radio mobile terminal located outside the permissible communication range, is not only unable to execute communication, but also execute channel scan for searching a waiting channel, thus leading to an increase of the degree of battery consumption. Accordingly, when a predetermined time has been passed with the radio mobile terminal found outside the range, power is provisionally cut off, thus preventing power consumption in the state that the radio mobile terminal is unable to execute communication.

As a different power consumption reducing method has been proposed one, in which the power consumption is saved by partly changing the functions of the circuit device of the radio mobile terminal (second technique, see Literature 2: Japanese Patent Laid-open No. 2000-278165, pages 8-14 and FIG. 1, for instance). This second technique deals with the reduction of power consumption in portable telephone sets in CDMA (Code Division Multiple Access) system.

Specifically, in the second technique different A/D (analog/digital) conversion bit numbers are set in the A/D converter at the time waiting speech and at time of communication such that the A/D bit number at the speech waiting time is less than that at the communication time, thereby reducing the power consumption in the A/D converter and a dispersion process computer and thus reducing the power consumption at the speech waiting time.

As a further power consumption reducing method has been proposed one, in which a radio part in a radio mobile terminal is on-off controlled during waiting time thereof, thereby saving the power consumption at the "off" time (third technique, see literature 3: Japanese Patent Laid-open No. 2002-118874, pages 4-6 and FIG. 1, for instance). In this third technique, when the user starts an on-off setting function of the radio part during the waiting time, the radio mobile terminal checks whether the radio part has been started.

In the duty service time, the user monitors whether an operation of stopping the radio part has been done. When the stopping operation has been performed, the user reports to the network that the radio part will be stopped, and stops the radio part. In this state, the speech waiting state is restored. When the stopping operation has not been done, like the above case the speech waiting state is restored with the radio part held without being stopped.

When the radio part is not in the duty service time at the time of the start of the on-off setting function in the reading part by the user, the user monitors whether the starting operation will be performed. When the user executes the starting operation, the radio part is started, and reports to the network that the radio part has been started. In this state, the speech waiting state is restored. Unless the user does not perform the radio part starting operation, the speech waiting state is restored.

In this third technique, since the radio mobile terminal user manually on-off controls the radio part, problems that the operation is cumbersome and that erroneous operation is liable are posed. A technique in which such radio part on-off operation is to be done automatically, has also been proposed (fourth technique, see Literature 4: Japanese Patent Laid-open No. Hei 7-131404, pages 4-5 and FIG. 2, for instance).

In this fourth technique, however, although a power saving effect is obtainable for a clearly predetermined scheduled non-use time, no power saving is made for a relatively long time such as a business time zone in an enterprise, in which the use of radio mobile terminal is presumed, and during such time no power saving effect can be obtained.

In this fourth technique, however, although a power saving effect is obtainable for a preliminary clearly predetermined non-use schedule time, no power saving is made for business time zones in enterprises or like relatively long time, during which the use of radio mobile terminals is presumed. Therefore, no power saving can be expected during such time.

Accordingly, as a technique different from the above techniques, a radio communication system, which seeks power saving, is in practical use. This radio communication system is called radio LAN system, and each radio mobile terminal can select a power-saving mode for saving power consumption and a normal mode. Each radio mobile terminal is adapted to report to the radio base station side whether or not the power-saving mode is to be used.

In the radio LAN system utilizing radio as transfer medium, each radio mobile terminal utilizes the power-saving mode by intermittently receiving announcement data (or beacon) from the radio base station. Specifically, when the radio mobile terminal is set to be in the power-saving mode, it reports to the radio base station by using a predetermined protocol that it is operating in the power-saving mode, and executes the operation of intermittently receiving announcement data.

The radio base station, receiving the report from the radio mobile terminal, buffers (stores) packets addressed to the radio mobile terminal operating in the power-saving mode in the memory of the own station, and report to the radio mobile terminal by using traffic display map (TIM) of announcement data that it has buffered packets addressed to the radio mobile terminal.

The radio mobile terminal receiving the announcement data from the radio base station, confirms the traffic display map and recognizes that the packets to addressed to itself have been buffered, whereupon it transmits a control message urging the distribution to the radio base station. The radio base station, receiving the control message urging the distribution from the radio mobile station, executes the operation of transmitting the buffered packets to the radio mobile terminal. The broadcast packets to all the radio mobile terminals belonging to the radio base station are transmitted after announcement data with DTIM (distribution traffic display message).

In the above prior art radio LAN system, the radio base station has to provisionally buffer and accumulate packets addressed to each radio mobile terminal operating in the power-saving mode as shown above in the memory in the own station until receiving a control packet urging the distribution sent out from the radio mobile terminal.

Also, in the case of this operation, in the real-time communication in which the radio mobile terminal has to play each packet as soon as it receives the packet, packets are provisionally accumulated in the radio base station and distributed in response to a poring from the radio mobile terminal in the next reception cycle thereof. Therefore, the packets are greatly delayed, leading to trouble occurrence in the playback.

Furthermore, in the prior art LAN system, from the consideration of the power saving in each radio mobile terminal, a broadcast packet is transmitted after announcement data with distribution traffic display message. Therefore, for receiving the broadcast packet, the radio mobile terminal should always receive announcement data with distribution traffic display message. This means that long cycle intermittent reception for realizing the power saving can no longer be made.

A physical address inquiry protocol for solving the physical address of the radio mobile terminal, is transmitted in the broadcast packet. Therefore, a radio mobile terminal which does not receive any announcement data with distribution traffic display message can not solve the physical address.

Still further, in the prior art radio LAN system, when the radio mobile terminal increases the intermittent reception cycle for reducing the power consumption, a delay is caused in the packet reception in the connection call process, thus giving rise to such problem as it is no longer possible to make a connection upon time-out in the opposite side terminal.

Yet further, in the prior art radio LAN system, when the radio mobile terminal is in the power-saving mode, the above real-time communication packet generation cycle is relatively shorter than the intermittent reception cycle in the radio mobile terminal, and this leads to the problem of overflow in the buffer in the radio base station.

Further, in the prior art radio LAN system, when a large number of radio mobile terminals operating in the power-saving mode come to belong to the radio base station, a very large number of memories are required for accumulating packets addressed to the radio mobile terminals.

Further, in the prior art radio LAN system, when a physical address solution protocol appears on the network, because of the broadcast packet, a problem arises that the limited band is consumed by the sending of the packet to the radio line irrespective of presence or absence of address to any radio mobile terminal.

SUMMARY OF THE INVENTION

Accordingly, an object of the present invention is to provide a radio network system, a radio base station and a radio mobile terminal agent processing method used for the system and the station, capable of power saving and trouble-free real-time communication.

According to an aspect of the present invention, there is provided a radio network system having a radio base station connected to a communication line and utilizing radio as data transfer medium and a plurality of radio mobile terminals connected via the radio base station to the communication line and utilizing the radio, wherein the radio base station includes means for managing the radio mobile terminal as to whether the terminal is in a power-saving mode for saving power by intermittent power reception and a normal mode with power received at all times on the basis of a predetermined protocol, means for receiving and discriminating broadcast packets addressed to the radio mobile terminals operating in the power-saving mode and, when the broadcast packet concerning a physical address inquiry is found, responding to the same broadcast packet as an agent for the pertinent radio mobile terminal to solve the physical address inquiry, and means for reporting the reception of the physical address inquiry to the radio mobile terminal operating in the power-saving mode to urge the pertinent radio mobile terminal to switch the operation mode to the normal mode.

According to another aspect of the present invention, there is provided a radio network system having a radio base station connected via an external control unit to a communication line and utilizing radio as transfer medium and a plurality of radio mobile terminals connected via the radio base station to the communication line and utilizing the radio, wherein the external control unit includes means for managing the radio mobile terminal as to whether the terminal is in a power-saving mode for saving power by intermittent power reception and a normal mode with power received at all times on the basis of a predetermined protocol, means for receiving and discriminating broadcast packets addressed to the radio mobile terminals operating in the power-saving mode and, when the broadcast packet concerning a physical address inquiry is found, responding to the same broadcast packet as an agent for the pertinent radio mobile terminal to solve the physical address inquiry, and means for reporting the reception of the physical address inquiry to the radio mobile terminal operating in the power-saving mode to urge the pertinent radio mobile terminal to switch the operation mode to the normal mode.

The solving means for the physical address inquiry responds to the broadcast packet as an agent for the pertinent radio mobile terminal without causing the same broadcast packet to be held in the own station.

The solving means for the physical address inquiry responds to the broadcast packet as an agent for the pertinent radio mobile terminal without sending out the same broadcast packet to the radio transfer line side.

According to other aspect of the present invention, there is provided a radio base station connecting a plurality of radio mobile terminals to a communication line by utilizing radio as data transfer medium comprising means for managing the radio mobile terminal as to whether the terminal is in a power-saving mode for saving power by intermittent power reception and a normal mode with power received at all times on the basis of a predetermined protocol; means for receiving and discriminating broadcast packets addressed to the radio mobile terminals operating in the power-saving mode and, when the broadcast packet concerning a physical address inquiry is found, responding to the same broadcast packet as an agent for the pertinent radio mobile terminal to solve the physical address inquiry; and means for reporting the reception of the physical address inquiry to the radio mobile terminal operating in the power-saving mode to urge the pertinent radio mobile terminal to switch the operation mode to the normal mode.

The solving means for the physical address inquiry responds to the broadcast packet as an agent for the pertinent radio mobile terminal without causing the same broadcast packet to be held in the own station.

The solving means for the physical address inquiry responds to the broadcast packet as an agent for the pertinent radio mobile terminal without sending out the same broadcast packet to the radio transfer line side.

According to further aspect of the present invention, there is provided a radio mobile terminal agent processing method for a radio network system having a radio base station connected to a communication line and utilizing radio as data transfer medium and a plurality of radio mobile terminal connected via the radio base station to the communication line and utilizing the radio, wherein the radio base station side executes a process of managing the radio mobile terminal as to whether the terminal is in a power-saving mode for saving power by intermittent power reception and a normal mode with power received at all times on the basis of a predetermined protocol, a process of receiving and discriminating broadcast packets addressed to the radio mobile terminals operating in the power-saving mode and, when the broadcast packet concerning a physical address inquiry is found, responding to the same broadcast packet as an agent for the pertinent radio mobile terminal to solve the physical address inquiry, and a process of reporting the reception of the physical address inquiry to the radio mobile terminal operating in the power-saving mode to urge the pertinent radio mobile terminal to switch the operation mode to the normal mode.

According to other aspect of the present invention, there is provided a radio mobile terminal agent processing method for a radio network system having a radio base station connected via an external control unit to a communication line and utilizing radio to a transfer medium and a plurality of radio mobile terminals connected via the radio base station to the communication line and utilizing radio, wherein the external control unit side executes a process of managing the radio mobile terminal as to whether the terminal is in a power-saving mode for saving power by intermittent power reception and a normal mode with power received at all times on the basis of a predetermined protocol, a process of receiving and discriminating broadcast packets addressed to the radio mobile terminals operating in the power-saving mode and, when the broadcast packet concerning a physical address inquiry is found, responding to the same broadcast packet as an agent for the pertinent radio mobile terminal to solve the physical address inquiry, and a process of reporting the reception of the physical address inquiry to the radio mobile terminal operating in the power-saving mode to urge the pertinent radio mobile terminal to switch the operation mode to the normal mode.

The solving process of the physical address inquiry responds to the broadcast packet as an agent for the pertinent radio mobile terminal without causing the same broadcast packet to be held in the own station.

The solving process of the physical address inquiry responds to the broadcast packet as an agent for the pertinent radio mobile terminal without sending out the same broadcast packet to the radio transfer line side.

In the present invention, the radio base station serves an agent for executing part of the processes of the radio mobile terminals, thus permitting realization of power saving and also trouble-free real-time communication.

Specifically, the radio base station according to the present invention manages the state of each radio mobile terminal, which is dynamically switched between a power saving and a normal mode, in dependence on whether or not a protocol necessary for real-time communication is present. When a radio mobile terminal is in the power-saving mode, the radio base station acts as an agent for responding to a physical address solution protocol addressed to the radio mobile terminal, and reports to the radio mobile terminal that it has made the response as the agent.

The radio base station according to the present invention can also suppress the sending of a physical address solution protocol addressed to a radio base station not belonging to it to the radio line, thus suppressing wasteful consumption of the limited radio band.

Other objects and features will be clarified from the following description with reference to attached drawings.

PREFERRED EMBODIMENTS OF THE INVENTION

Preferred embodiments of the present invention will now be described with reference to the drawings.

Figure 1:
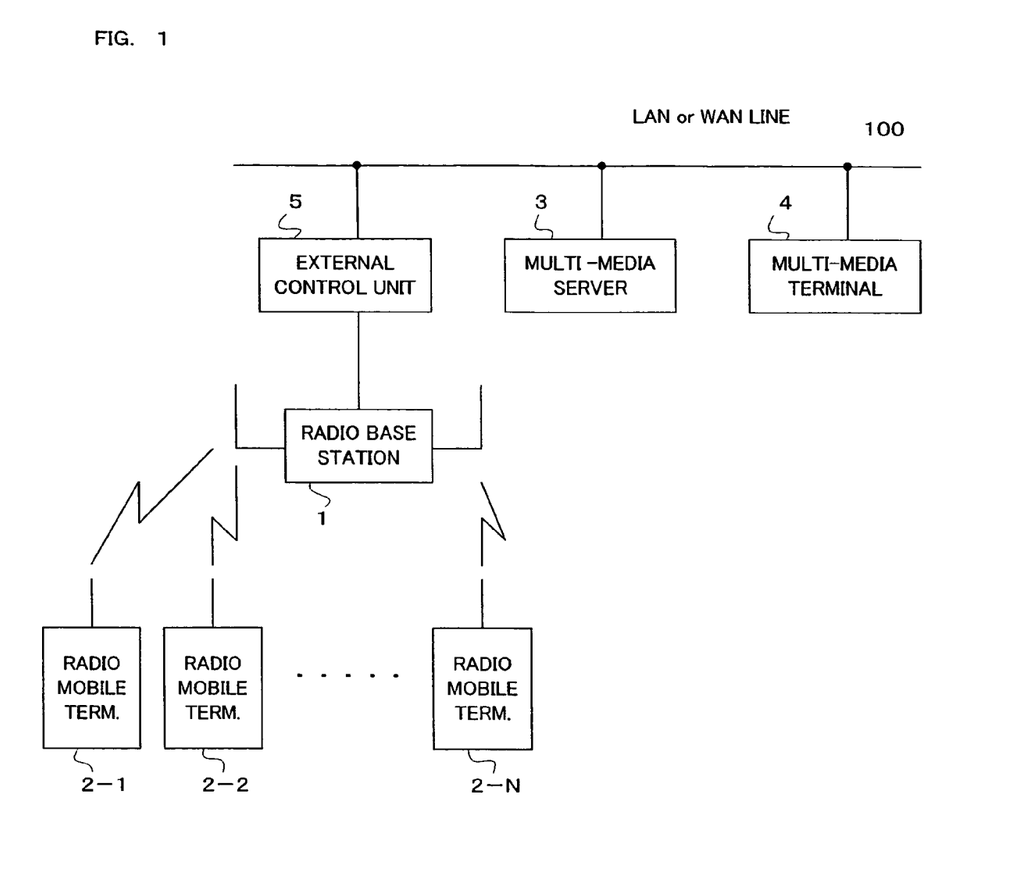
FIG. 1 is a block diagram showing the constitution of an embodiment of the radio network system according to the present invention.

FIG. 1 is a block diagram showing the constitution of an embodiment of the radio network system according to the present invention. Referring to the Figure, a multi-media radio network system is shown as an example, which is constituted by a plurality of radio mobile terminals 2-1 to 2-N utilizing radio as data transfer medium and a radio base station 1 connected to a LAN (local area network) or WAN (wide area network) line 100 for providing real-time communication of voice, motion picture images, etc.

The radio mobile terminals 2-1 to 2-N can perform communication using IP (internet protocol) with a multi-media server 3 or a multi-media terminal unit 4, connected to the LAN or WAN line 100, via the radio base station 1 and an external control unit 5.

As for the procedure of connection of the radio mobile terminals 2-1 to 2-N to the multi-media server 3 or the multi-media terminal unit 4, such prescriptions as Recommendation H. 323 by ITU (International Telecommunication Union) and SIP (Session Initiation Protocol) (RFC 3261) of IETF (Internet Engineering Task Force) are provided. However, according to the present invention no particular limitation is imposed on the procedure, and these prescriptions are not described.

The multi-media terminal unit 4 serves to produce and edit such multi-media data as voice and images. The multi-media server 3 has a role of transmitting multi-media data produced and edited by the multi-media terminal unit 4 to one of the radio mobile terminals 2-1 to 2-N and distributing multi-media data transmitted from one of the radio mobile terminals 2-1 to 2-N to the multi-media terminal unit or other unit via the LAN or WAN line 100. The multi-media server 3 can also handle real-time data, typically multi-media data, produced and edited by a unit (not shown) other than the multi-media terminal unit 4.

The external control unit 5 is provided between the LAN or WAN line 100 and the radio base station 1 and serves to control broadcast packets. The external control unit 5 may be omitted, and in this case the radio base station 1 maybe directly connected to the LAN or WAN line 100. Also, the radio base station 1, which is connected to the LAN or WAN line 100 in this embodiment, may be connected to a different communication network as well.

The radio mobile terminals 2-1 to 2-N each perform connection negotiation by using the radio base station 1 and a radio physical layer, and operates as terminal of the instant network. When each of the radio mobile terminal 2-1 to 2-N completes the negotiation, it receives announced data from the radio base station 1, then develops each data element to obtain announced data interval, and operates in the power-saving mode for suppressing the power consumption by long cycle intermittent reception with an initially set counter value.

When each of the radio mobile terminals 2-1 to 2-N is going to be switched over to the power-saving mode, it does so by using a frame control field with respect to the radio base station 1, and then sends out a control packet with a report content that intermittent reception is going to be performed.

The radio base station 1 recognizes from the control packet reception that the pertinent one of the radio mobile terminals 2-1 to 2-N has been switched to the power-saving mode, and then executes an operation of buffering packets addressed to the pertinent radio mobile terminal in its own memory (not shown) and reports the presence or absence of any packet addressed to the pertinent radio mobile terminal with a traffic display map of broadcast data.

The pertinent radio mobile station intermittently receives the announced data from the radio base station 1, and adjust the intermittent reception cycle on the basis of RSSI (Received Signal Strength Indication, i.e., received signal level) and FER (Frame Error Rate) of the received announced data.

Furthermore, when the radio mobile stations 2-1 to 2-N are moved to the outside of the service area so that they can no longer receive announced data from the radio base station and thus that they are in the outside of the service area, they operate to provide for more power saving with a very long intermittent reception cycle.

Figure 2:
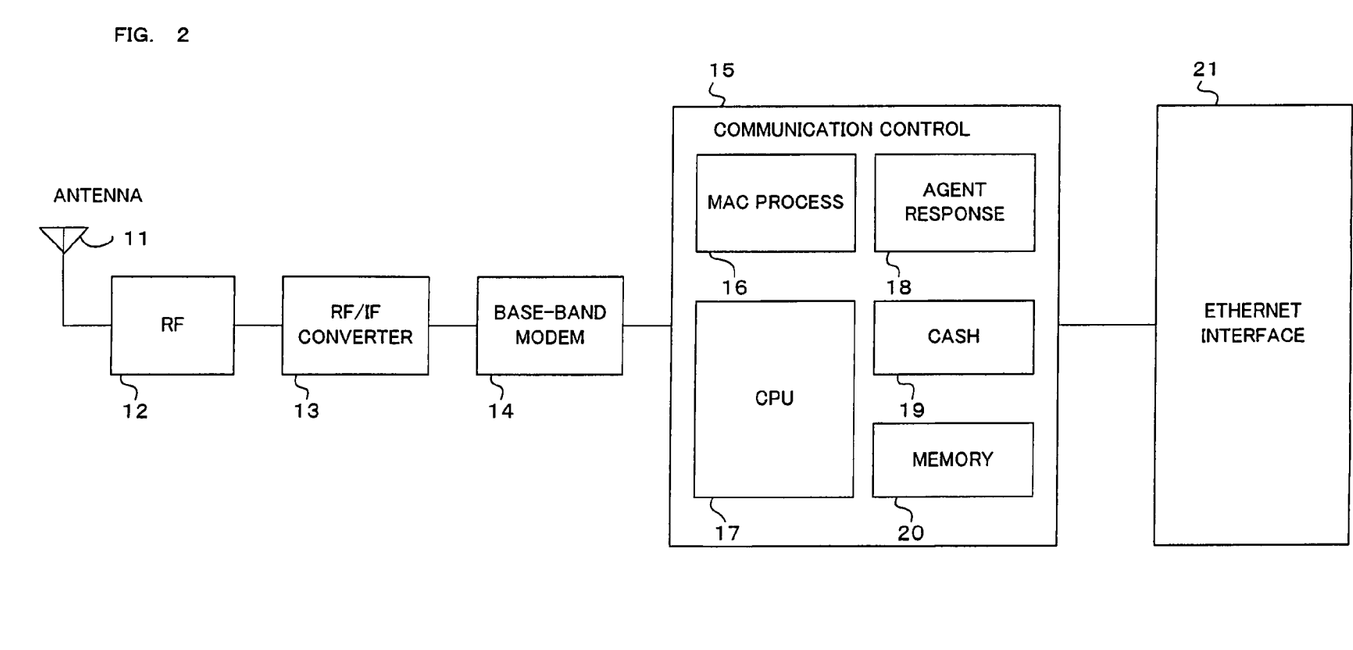
FIG. 2 is a block diagram showing the arrangement of the radio base station 1 shown in FIG. 1.

FIG. 2 is a block diagram showing the arrangement of the radio base station 1 shown in FIG. 1. Referring to FIG. 2, the radio base station 1 includes an antenna 11, an RF (Radio Frequency) part 12, an RF/IF (Intermittent Frequency) converter part 13, a base-band modem (modulating/demodulating unit) 14, a communication control part 15 and an ethernet (R) interface part 21.

The communication control part 15 includes an MAC (Media Access Control) process part 16, a CPU (central processing unit) 17, an agent response part 18, a cache part 19 and a memory 20, and it is connected via an ethernet (R) interface part 21 to the external control unit 5 for outputting and inputting packet signals from and to the LAN or WAN line 100.

The CPU 17 serves to execute various controls in the communication control part 15. In the memory 20, control programs for various controls executed by the CPU 17 are stored. In the cache part 19, real-time data or like data are provisionally stored.

The MAC processing part 16 processes MAC addresses. The agent response part 18 serves as a response agent for a pertinent one of the radio mobile stations 2-1 to 2-N with respect to broadcast communication. The MAC processing part 16 and the agent response part 18 need not be formed as actual circuits, but they may also be realized as software by control programs stored in the memory 20.

The communication control part 15 is connected to the side of the base-band modem 14 in the series circuit constituted by the base-band modem 14, the RF/IF converter part 13 and the RF part 12. The antenna 11 is connected to the side of the RF part 12 in the series circuit.

A packet signal sent out from the ethernet (R) interface part 21 to the communication control part 15 is given a destination address therein, then converted in the base-band modem 14 and then converted in the RF/IF converter part 13 to a harmonic signal for transmission. The harmonic signal thus obtained is sent out from the RF part 12 via the antenna 11 into space and received by the pertinent destination one of the radio mobile terminals 2-1 to 2-N.

A radio signal sent out from any one of the radio mobile terminals 2-1 to 2-N is received via the antenna 11 in the RF part 12, then converted in the RF/IF converter part 13 to an intermediate frequency signal, then demodulated in the base-band modem 14, then subjected to a predetermined process in the communication control part 15, and then sent out from the ethernet (R) interface part 21 via the LAN or WAN line 100 to the destination such as the multi-media terminal unit 4.

Figure 3:
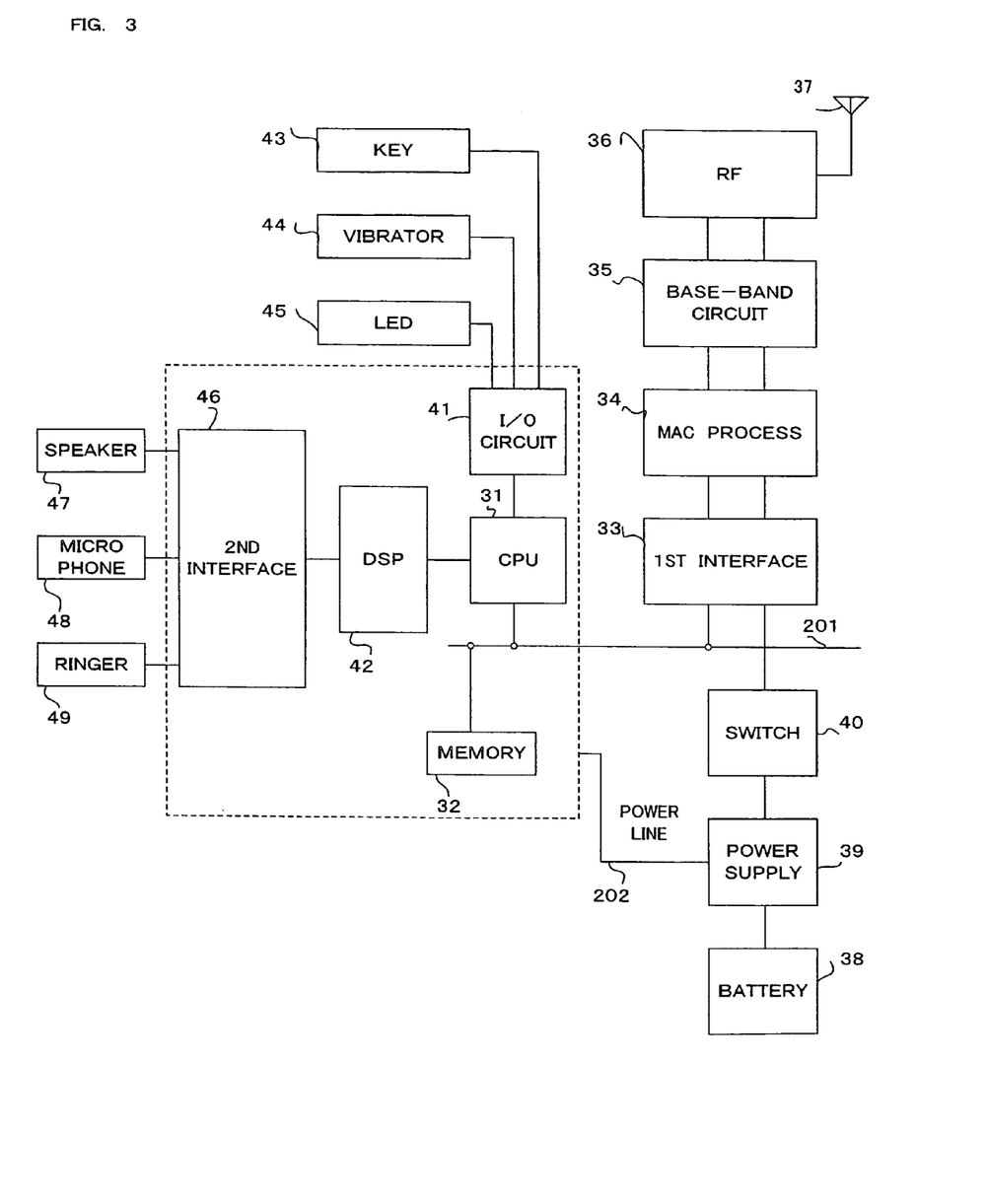
FIG. 3 is a block diagram showing the arrangement of each of the radio mobile terminals 2-1 to 2-N shown in FIG. 1.

FIG. 3 is a block diagram showing the arrangement of each of the radio mobile terminals 2-1 to 2-N. Referring to FIG. 3, the radio mobile terminals 2-1 to 2-N are each constituted by a portable data unit with communication function such as a portable telephone set, a PHS (Personal Handy-phone System), a PDA (Personal Digital Assistant) and a note-type personal computer (hereinafter referred to as personal computer).

The radio mobile terminals 2-1 to 2-N each include a CPU 31, a memory 32, a first interface circuit 33, a MAC processing unit 34, a base-band circuit 35, an RF part 36, an antenna 37, a battery 38, a power supply part 39, a switch 40, an I/O (input/output) circuit 41, a DSP (Digital Signal Processor) 42, a keyboard 43, a vibrator 44, an illumination LED (light-emitting diode) 45, a second interface circuit 46, a loudspeaker 47, a microphone 48 and a ringer 49.

The CPU 31 has center functions such as various control in each of the radio movable terminals 2-1 to 2-N. In the memory 32, control programs executed by the CPU 31 are stored, and operation data are provisionally stored. The CPU 31, the memory 32 and the first interface circuit 33 are interconnected via a bus 201.

To the first interface circuit 33 is connected one end of a series circuit constituted by the MAC processing circuit 34, which processes MAC addresses of LAN, the base-band circuit 35, which processes base-band signals, and the RF part 36. The RF part 36 is connected to the antenna 37 for radio transmission and reception.

The first interface circuit 33, the MAC processing circuit 34, the base-band circuit 35 and the RF part 36 receive power supply in an on-off controllable form from the power supply part 39, to which the battery 38 is connected, via the switch circuit 40.

The CPU 31 is connected to the I/O circuit 41 and the DSP 42 as well as to the bus 201. To the I/O circuit 41 are connected various circuits such as the keyboard 43 for inputting letters and the like, the vibrator 44 for providing announcement in the form of vibrations and the illumination LED 45 for illuminating a display (not shown) at the time of communication or the like.

The DSP 42 is connected via the second interface circuit 46 to the loud-speaker 47, the microphone 48 and the ringer 49. The ringer 49 is a circuit for outputting sound when calling an opposite party of communication.

The CPU 31, the memory 32, the I/O circuit 41, the DSP 42 and the second interface circuit 46 are directly connected via the power supply line 202 to the power supply part 39. These parts are supplied with power at all times unless the power output of the power supply part 39 is turned off by a main switch (not shown).

The switch circuit 40, on the other hand, is turned on for power supply from the power supply part 39 when and only when the radio mobile terminals 2-1 to 2-N are in the power-saving mode and also in the state of doing transmission and reception, and it is "off" in other times than this time zone.

With the above arrangement, the radio mobile terminals 2-1 to 2-N are dynamically switched between the power-saving and normal modes in dependence on whether or not any protocol requiring real-time communication is present.

Specifically, when doing real-time communication of voice or motion picture images, the radio mobile terminals 2-1 to 2-N in the power-saving mode recognize this by receiving a call process packet, and then reports switching of the power-saving mode to the normal mode to the side of the ratio base station 1.

Thus, the radio mobile terminals 2-1 to 2-N subsequently receive packet signal of the real-time communication without delay. Also, at the time of the end of real-time communication, the radio mobile terminals 2-1 to 2-N are dynamically switched back to the power-saving mode, so that they can subsequently do power-saving operation.

In the case of communication other than the real-time communication, the radio mobile terminals 2-1 to 2-N detect from a received call process packet that other communication than the real-time one will be performed. The radio mobile terminals 2-1 to 2-N thus progressively receive packet signals stored in the cache part 19 in the radio base station 1 while remaining in the power-saving mode.

Figure 4:
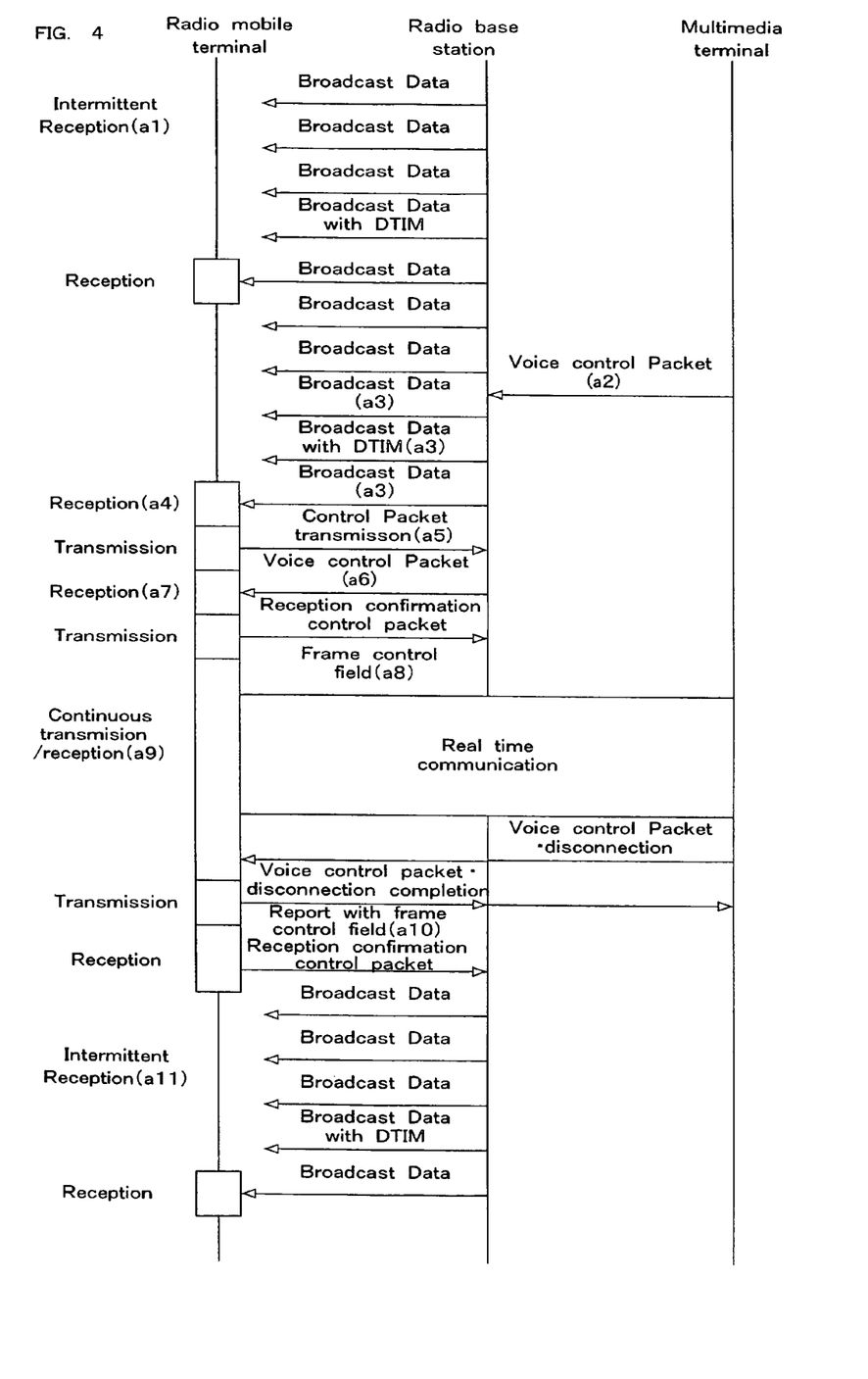
FIGS. 4 and 5 are sequence charts representing operations of the radio network system according to the embodiment of the present invention.
Figure 5:
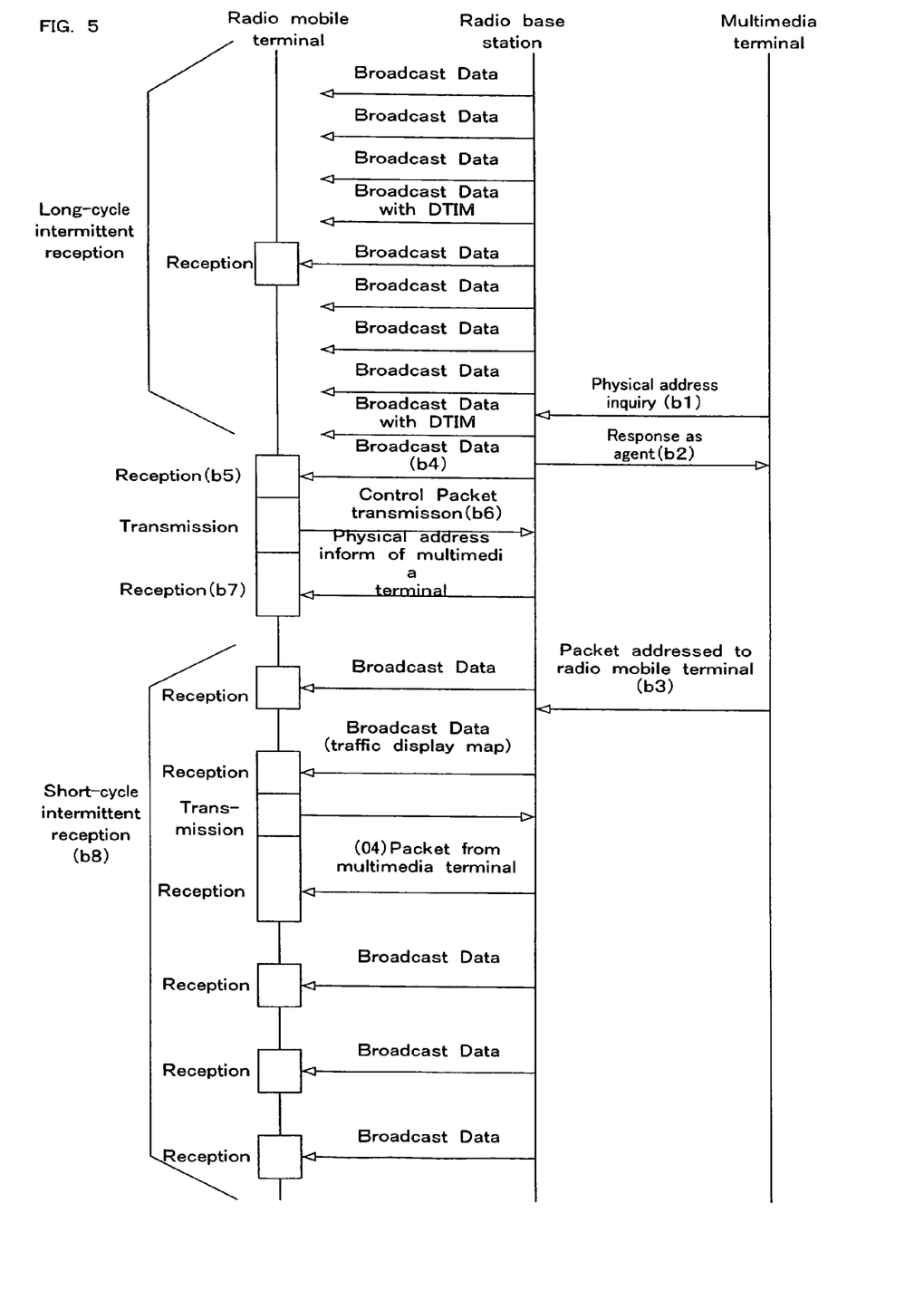

FIGS. 4 and 5 are sequence charts illustrating operations of the embodiment of the radio network system according to the present invention. The operations of the embodiment of the radio network system according to the present invention will now be described with reference to FIGS. 1 to 4. The following description concerns an example of operation in the case of transmission of voice from the multi-media terminal unit 4 to the radio mobile terminals 2-1 to 2-N and also transmission and reception of signals among the radio mobile terminals 2-1 to 2-N, the radio base station 1 and the multi-media terminal unit 4 connected to the LAN or WAN line 100.

After the end of the above negotiation, the radio mobile terminals 2-1 to 2-N each operates as one terminal on the network and go to long cycle intermittent reception in the power-saving mode (a1 in FIG. 4).

The multi-media terminal unit 4 sends out a call control packet for communication among the radio mobile terminals 2-1 to 2-N during operation in the power-saving mode to the radio base station 1 (a2 in FIG. 4). The call control packet from the multi-media terminal unit 4 is once stored in the cache part 19 in the radio base station 1, and is reported in the traffic display map of the announced data to the radio mobile terminals 2-1 to 2-N (a3 in FIG. 4).

The radio mobile terminals 2-1 to 2-N receive announced data in the next reception timing (as in FIG. 4), then develop the individual data elements, then recognize from the traffic display map that there are packets addressed to themselves, and send out control packets urging the distribution to the radio base station 1 (a5 in FIG. 4).

After the radio base station 1 receives the control packets urging the distribution from the radio mobile terminals 2-1 to 2-N, it distributes a packet from the multi-media terminal unit 4, as stored in the cache 19, to the radio mobile stations 2-1 to 2-N (a6 in FIG. 4).

When the radio mobile terminals 2-1 to 2-N receiving and developing the packet from the radio base station 1 recognize that the packet is a message (voice call control packet) requiring real-time communication (a7 in FIG. 4), they report, for transmitting the response to the call control packet, that they are going to be switched from the power-saving mode to the normal mode to the radio mobile station 1 by using the frame control field (a8 in FIG. 4), and execute continuous transmitting/receiving operation (a9 in FIG. 4).

The radio base station 1 recognizes, in the frame control field of the response packets from the radio mobile terminals 2-1 to 2-N, that the radio mobile terminals 2-1 to 2-N have been switched to the normal mode, and it performs a subsequent operation of transmitting packets addressed to the radio mobile stations 2-1 to 2-N from the multi-media terminal unit 4 without storing the packets in the cache part 19.

In this way, real-time communication between the radio mobile terminals 2-1 to 2-N and the multi-media terminal unit 4 is brought about.

When the radio mobile stations 2-1 to 2-N receive the call control packet to end the voice communication from the multi-media terminal unit 4, they report, in the frame control field of a disconnection end message, to the radio base station 1 that they will do intermittent reception in the power-saving mode (a10 in FIG. 4), and then goes again to the operation of long cycle intermittent reception (a11 in FIG. 4).

In case when the radio mobile terminals 2-1 to 2-N have performed the disconnection by themselves, after receiving the disconnection completion message from the multi-media terminal unit 4, they report, in the frame control field, to the radio base station that they will perform again the intermittent reception in the power-saving mode, and executes the operation of switching to the operation of the long cycle intermittent reception and suppressing the power consumption.

As shown above, in this embodiment, when the radio mobile terminals 2-1 to 2-N perform real-time communication of voice, motion picture images, etc., they can receive real-time communication packets without delay by recognizing processed packets, performing report in the field control frame to the radio base station 1 and performing continuous transmission and reception in the normal mode.

Also, in this embodiment the radio mobile terminals 2-1 to 2-N can perform power-saving operation by causing their dynamic switching to the power-saving mode after completion of the real-time communication. Furthermore, in this embodiment the radio base station 1 performs optimum traffic distribution in dependence on the state of the radio mobile terminals 2-1 to 2-N, whereby both the real-time communication and the power-saving operation can be attained in the radio mobile terminals 2-1 to 2-N.

Now, the operation in the case when the radio base station 1 acts as an agent for executing part of the processes in the radio mobile terminals 2-1 to 2-N during operation in the power-saving mode will be described.

When a broadcast packet for solving the physical addresses of the radio mobile terminals 2-1 to 2-N appears on the LAN or WAN line 100 in the power-saving mode operation of the radio mobile terminals 2-1 to 2-N, the radio mobile terminals 2-1 to 2-N may not always receive announced data (Beacon) with distributed traffic display message (DTIM). In other words, there may occur a case when the broadcast packet for solving the physical address can not be received.

As described above, the radio base station 1 recognizes the states of the radio mobile terminals 2-1 to 2-N from the reports in the frame control field from the radio mobile terminals 2-1 to 2-N, and stores the recognized states.

FIG. 5 shows the transmission and reception of signals among the radio mobile terminals 2-1 to 2-N, the radio base station 1 and the multi-media terminal unit 4, which generates broadcast packets for solving physical addresses, in the multi-media radio network system constituted by the radio mobile terminals 2-1 to 2-N and the radio base station 1.

The multi-media terminal unit 4 sends out the broadcast packets for solving the physical addresses to the radio mobile terminals 2-1 to 2-N performing long cycle intermittent reception in the power-saving mode (b1 in FIG. 5).

At this time, since the radio mobile terminals 2-1 to 2-N are performing the long cycle intermittent reception, they may not be able to receive announced data (or beacon) with distributed traffic display message (DTIM), the multi-cast packet from the multi-media terminal unit 4 is broadcast to individual nodes constituting the multi-media radio network.

The radio base station 1 knows that the radio mobile terminals 2-1 to 2-N are in operation of intermittent reception in the power-saving mode and also have recognized and stored the physical addresses of the radio mobile terminals 2-1 to 2-N, so that it responds to the broadcast packet from the multi-media terminal unit 4 as an agent of the radio mobile terminals 21 to 2-N (b2 in FIG. 5). In this way, the physical address inquiry from the multi-media terminal unit 4 to the radio mobile terminals 2-1 to 2-N is solved.

At the same time, since the radio base station 1 has received physical address inquiry from the multi-media terminal unit 4 with respect to the radio mobile terminals 2-1 to 2-N, it performs an operation of preliminarily reporting to the radio mobile terminals 2-1 to 2-N in the traffic display map of the announced data that it will generate packets to be received by the radio mobile terminals 2-1 to 2-N (b4 in FIG. 5).

The radio mobile terminals 2-1 to 2-N obtain the announced data from the radio base station in the next reception timing, develop the individual data elements, confirm packets addressed to the own station from the traffic display map, then transmit control packet urging the distribution to the radio base station 1 (b6 in FIG. 5), and obtain the physical address of the multi-media terminal unit 4 generated as uni-cast by the radio base station 1 (b7 in FIG. 5).

When the radio mobile terminals 2-1 to 2-N obtain the physical address of the multi-media terminal unit 4 from the radio base station 1, they reduce the power-saving mode intermittent reception interval to the cycle of the announced data from the radio base station 1, and perform short interval intermittent reception operation to be able to prepare for quickly receiving the subsequent packet addressed to the own station (b8 in FIG. 5).

Thus, in this embodiment, even when the radio mobile terminals 2-1 to 2-N operate the power-saving mode without receiving any announced data with distributed traffic display message, it is possible to obtain solution to the physical addresses and prevent disability of connection due to the time-out of the opposite side terminal otherwise caused by a delay in the reception of a connection call process packet with increase of the intermittent reception cycle.

Also, in this embodiment, packets at the time of real-time communication are not stored in the cache part 19 in the radio base station 1 in dependence on the states of the radio mobile terminals 2-1 to 2-N, and it is thus possible to solve the overflow problem in the cache part 19 in the radio base station 1.

Furthermore, in this embodiment, even with increase of the radio mobile terminals 2-1 to 2-N performing the real-time communication in the radio base station 1, without storage of any packet at the time of the real-time communication in the cache part 19 in the radio base station 1, it is possible to solve the problem of increasing a very large number of memories for accumulating packets addressed to the radio mobile terminals when it comes that a large number of radio mobile terminals 2-1 to 2-N operating in the power-saving mode belong to the radio base station 1.

Still further, in this embodiment, the broadcast packets for inquiring the physical addresses of the subscriber radio mobile terminals 2-1 to 2-N are unnecessary data for radio mobile terminals other than those receiving the inquiries, and thus the radio base station 1 does not act as any response agent for transmission to the radio line with respect to the broadcast packets. Thus, it is possible to solve the problem of consumption of the limited band width by sending out broadcast packet to the radio line irrespective of whether or not the radio mobile terminals are addressed in the event of generation of a physical address solution protocol message in the network.

While the embodiment has been described in connection with the operations with respect to the multi-media terminal unit 4, operations like those with respect to the multi-media terminal unit 4 are also obtainable with respect to the multi-media server 3.

Also, while the embodiment has been described in connection with the operation between the radio mobile terminals 2-1 to 2-N and the radio base station 1, it is also possible to cause the external control unit 5 to do the operation in lieu of the radio base station 1.

As shown above, according to the present invention, in the radio network system, which comprises the radio base station 1 connected to the LAN or WAN line 100 and utilizing radio wave as transfer medium and the radio mobile terminals 2-1 to 2-N connected via the radio base station 1 to the LAN or WAN line 100 and utilizing radio as transfer medium, the radio base station manages the states of the radio mobile terminals 2-1 to 2-N, which are dynamically switched between the power-saving and normal modes in dependence on whether or not any protocol necessary requiring real-time communication, to act as an agent to respond to a physical address solution protocol addressed to a radio mobile terminal, and a means for reporting to the pertinent radio mobile terminal that it has made the agent response, is provided in the radio base station land the external control unit 5 disposed between the radio base station and the LAN or WAN line 100. Thus, it is possible to realize power saving and also realize trouble-free real-time communication.

As has been described in the foregoing, according to the present invention it is possible, with the above arrangement and operations, to obtain the advantages of realizing power saving in trouble-free real-time communication.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A radio network system having a radio base station connected to a communication line and utilizing radio as a data transfer medium and a plurality of radio mobile terminals connected via the radio base station to the communication line, the radio base station comprising:
    means for managing a radio mobile terminal of the plurality of radio mobile terminals as to whether the radio mobile terminal is in a power-saving mode for saving power by intermittent power reception or a normal mode with power received at all times on the basis of a predetermined protocol;
    means for receiving and discriminating by an apparatus at a first node of the radio network system broadcast packets traveling over the communication line addressed to the radio mobile terminal operating in the power-saving mode and, when a broadcast packet concerning a physical address inquiry is found among the broadcast packets traveling over the communication line addressed to the radio mobile terminal, responding to the broadcast packet by the apparatus as an agent for the radio mobile terminal to solve the physical address inquiry; and
    means for reporting the reception of the physical address inquiry to the radio mobile terminal operating in the power-saving mode to urge the radio mobile terminal to switch to the normal mode.

2. A radio network system having a radio base station connected via an external control unit to a communication line and utilizing radio as a data transfer medium and a plurality of radio mobile terminals connected via the radio base station to the communication line;
    the external control unit includes a managing apparatus operable to manage a radio mobile terminal of the plurality of radio mobile terminals as to whether the radio mobile terminal is in a power-saving mode for saving power by intermittent power reception or a normal mode with power received at all times on the basis of a predetermined protocol;
    a receiving apparatus operable for receiving and discriminating broadcast packets traveling over the communication line addressed to the radio mobile terminal operating in the power-saving mode and, when a broadcast packet concerning a physical address inquiry is found among the broadcast packets traveling over the communication line addressed to the radio mobile terminal, responding to the broadcast packet as an agent for the radio mobile terminal to solve the physical address inquiry; and
    a reporting apparatus operable for reporting the reception of the physical address inquiry to the radio mobile terminal operating in the power-saving mode to urge the radio mobile terminal to switch to the normal mode.

3. The radio network system according to claim 2, wherein the receiving apparatus responds to the broadcast packet as an agent for the radio mobile terminal without causing the same broadcast packet to be held at the base station.

4. The radio network system according to one of claims 1 and 2, wherein the receiving apparatus responds to the broadcast packet as an agent for the radio mobile terminal without sending out the same broadcast packet via the radio transfer medium.

5. A radio base station connecting a plurality of radio mobile terminals to a communication line by utilizing radio as a data transfer medium, the radio base station comprising:
    means for managing a radio mobile terminal of the plurality of radio mobile terminals as to whether the radio mobile terminal is in a power-saving mode for saving power by intermittent power reception or a normal mode with power received at all times on the basis of a predetermined protocol;
    means for receiving and discriminating broadcast packets traveling over the communication line addressed to the radio mobile terminal operating in the power-saving mode and, when a broadcast packet concerning a physical address inquiry is found among the broadcast packets traveling over the communication line addressed to the radio mobile terminal, responding to the broadcast packet as an agent for the radio mobile terminal to solve the physical address inquiry; and
    means for reporting the reception of the physical address inquiry to the radio mobile terminal operating in the power-saving mode to urge the radio mobile terminal to switch to the normal mode.

6. The radio base station according to claim 5, wherein the solving means for the physical address inquiry responds to the broadcast packet as an agent for the pertinent radio mobile terminal without causing the same broadcast packet to be held at the base station.

7. The radio base station according to claim 5, wherein the solving means for the physical address inquiry responds to the broadcast packet as an agent for the radio mobile terminal without sending out the same broadcast packet via the radio transfer medium.

8. A radio mobile terminal agent processing method for a radio network system having a radio base station connected to a communication line and utilizing radio as a data transfer medium and a plurality of radio mobile terminals connected via the radio base station to the communication line and utilizing the radio, wherein the radio base station executes:
    a process of managing a radio mobile terminal of the plurality of radio mobile terminals as to whether the radio mobile terminal is in a power-saving mode for saving power by intermittent power reception or a normal mode with power received at all times on the basis of a predetermined protocol;
    a process of receiving and discriminating broadcast packets traveling over the communication line addressed to the radio mobile terminal operating in the power-saving mode and, when a broadcast packet concerning a physical address inquiry is found among the broadcast packets traveling over the communication line addressed to the radio mobile terminal, responding to the broadcast packet as an agent for the radio mobile terminal to solve the physical address inquiry; and
    a process of reporting the reception of the physical address inquiry to the radio mobile terminal operating in the power-saving mode to urge the radio mobile terminal to switch to the normal mode.

9. A radio mobile terminal agent processing method for a radio network system having a radio base station connected via an external control unit to a communication line and utilizing radio as a data transfer medium and a plurality of radio mobile terminals connected via the radio base station to the communication line, wherein the external control unit executes:

a process of managing a radio mobile terminal of the plurality of radio mobile terminals as to whether the radio mobile terminal is in a power-saving mode for saving power by intermittent power reception or a normal mode with power received at all times on the basis of a predetermined protocol;

a process of receiving and discriminating broadcast packets traveling over the communication line addressed to the radio mobile terminal operating in the power-saving mode and, when a broadcast packet concerning a physical address inquiry is found among the broadcast packets traveling over the communication line addressed to the radio mobile terminal, responding to the broadcast packet as an agent for the radio mobile terminal to solve the physical address inquiry; and a process of reporting the reception of the physical address inquiry to the radio mobile terminal operating in the power-saving mode to urge the radio mobile terminal to switch to the normal mode.

10. The radio mobile terminal agent processing method according to one of claims 8 and 9, wherein the solving process of the physical address inquiry responds to the broadcast packet as an agent for the pertinent radio mobile terminal without causing the same broadcast packet to be held at the base station.

11. The radio mobile terminal agent processing method according to one of claims 8 and 9, wherein the solving process of the physical address inquiry responds to the broadcast packet as an agent for the pertinent radio mobile terminal without sending out the same broadcast packet via the radio transfer medium.

\* \* \* \* \*